(12) United States Patent
Alves et al.

(10) Patent No.: US 11,216,329 B2
(45) Date of Patent: Jan. 4, 2022

(54) MAINTENANCE INTERVENTION PREDICTING

(71) Applicant: Hewlett-Packard Development Company, L.P., Spring, TX (US)

(72) Inventors: Luciano Alves, Porto Alegre (BR); Fernando Friedrich, Porto Alegre (BR); Anderson Neves, Porto Alegre (BR); Douglas Oliveira, Porto Alegre (BR); Kelvin Reinhardt, Porto Alegre (BR); Paulo Urbano, Porto Alegre (BR); Paulo Neto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/769,355

(22) PCT Filed: Jan. 26, 2018

(86) PCT No.: PCT/US2018/015538
§ 371 (c)(1),
(2) Date: Jun. 3, 2020

(87) PCT Pub. No.: WO2019/147271
PCT Pub. Date: Aug. 1, 2019

(65) Prior Publication Data
US 2020/0293392 A1    Sep. 17, 2020

(51) Int. Cl.
*G06F 11/00*    (2006.01)
*G06F 11/07*    (2006.01)
(Continued)

(52) U.S. Cl.
CPC ........ *G06F 11/079* (2013.01); *G06F 11/0736* (2013.01); *G06F 11/0751* (2013.01);
(Continued)

(58) Field of Classification Search
CPC ............ G06F 11/3409; G06F 11/3466; G06F 11/3058; G06F 11/004
See application file for complete search history.

(56) References Cited

U.S. PATENT DOCUMENTS

2003/0115945 A1    6/2003  Tsujita
2012/0179326 A1*   7/2012  Ghelam .............. G06F 11/3013
                                              701/31.9
(Continued)

FOREIGN PATENT DOCUMENTS

EP    3088199 A4       12/2017
WO    WO-2014043623    3/2014
WO    WO-2017116627    7/2017

OTHER PUBLICATIONS

Big Data Repulic—Machine Learning for Predictive Maintenance: Where to Start?—Aug. 20, 2017—8 pages.
(Continued)

*Primary Examiner* — Charles Ehne
(74) *Attorney, Agent, or Firm* — Brooks Cameron & Huebsch PLLP (57) ABSTRACT

Examples include a non-transitory machine-readable storage medium having stored thereon machine-readable instructions executable to cause a processing resource to monitor sensory inputs related to a device, monitor a first maintenance intervention related to the device, store data relating to the monitored sensory inputs and the first maintenance intervention in a centralized database, and predict a second maintenance intervention based on the data stored in the centralized database.

14 Claims, 4 Drawing Sheets

(51) Int. Cl.
  *G06F 16/23*   (2019.01)
  *G06N 20/00*   (2019.01)
  *G06F 11/30*   (2006.01)
  *G06F 11/34*   (2006.01)

(52) U.S. Cl.
  CPC ...... *G06F 11/0787* (2013.01); *G06F 11/3013* (2013.01); *G06F 11/3495* (2013.01); *G06F 16/2379* (2019.01); *G06N 20/00* (2019.01)

(56) References Cited

U.S. PATENT DOCUMENTS

| | | | |
|---|---|---|---|
| 2014/0361978 A1* | 12/2014 | Malarky | G06F 11/3058 345/156 |
| 2015/0227838 A1* | 8/2015 | Wang | G06N 7/00 706/12 |
| 2016/0104123 A1* | 4/2016 | Viswanath | G06F 16/245 705/305 |
| 2016/0350671 A1 | 12/2016 | Morris, II et al. | |
| 2017/0308802 A1 | 10/2017 | Romsoy et al. | |

OTHER PUBLICATIONS

Indyk—Predictive Maintenance at Machine Learning Conference in Prague—Apr. 6, 2017—2 pages.
Le Comte—Predictive Maintenance is one of the Most Valuable Applications for Machine Learning—Jan. 11, 2017—4 pages.

\* cited by examiner

MAINTENANCE INTERVENTION PREDICTING

BACKGROUND

During the life cycle of a device, there are failures that may lead to a maintenance intervention. A maintenance intervention can include a maintenance technician performing maintenance on a device that has experienced a failure or is identified as being close to failure. The failure can include what is referred to as a wear out failure, which can occur when the device has exceeded an estimated lifetime.

DETAILED DESCRIPTION

Many industries are selling device usage and maintenance as a service. Devices associated with the service can include maintenance costs, such as technical support visits and replacements of parts that have worn out. Device monitoring systems can be utilized to identify failures associated with the devices quickly, thereby speeding up a return to production when downtime occurs. However, maintenance on devices, such as printers, provided as a service may either be reactive or preventive. The former may lead to unexpected costs or scheduling conflicts that may increase the downtime of the device. The latter may result in unnecessary costs that could be avoided in cases where the device is not approaching a failure.

Maintenance intervention predicting, as described herein, can provide insight to when devices will most likely fail in a particular time period, which can improve maintenance scheduling. For example, a maintenance team may decide to visit a site to perform maintenance on devices that are evaluated as being close to failing (e.g., failing within a particular time period). Moreover, after attending a maintenance call, the maintenance team may perform maintenance on devices located nearby that are likely to fail in a particular time period.

Some examples of the present disclosure are directed to maintenance intervention predicting. Maintenance intervention predicting as disclosed herein can include predictive maintenance driven by data analytics and machine learning techniques, which can allow for a maintenance schedule that reduces maintenance costs. For instance, intervention predicting can include monitoring sensory inputs and a first maintenance intervention related to a device. Data relating to the monitored sensory inputs and the first maintenance intervention can be stored in a centralized database, and a second maintenance intervention can be predicted based on the data stored in the centralized database.

Figure 1:
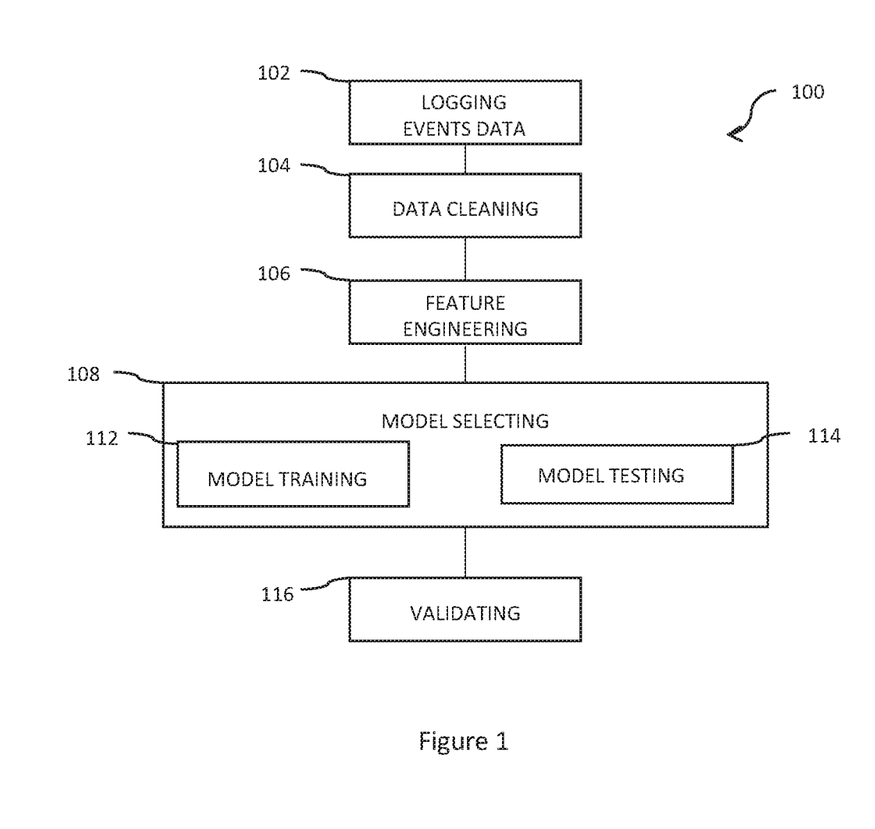
FIG. 1 illustrates flow chart for selecting a machine learning model for maintenance intervention predicting consistent with the disclosure.

FIG. 1 illustrates a flow chart 100 for selecting a machine learning model for maintenance intervention predicting consistent with the disclosure. The machine learning model can be, but is not limited to, a supervised machine learning model. As described herein, machine learning includes building a model that can receive input data and uses statistical analysis to predict an output value. Supervised machine learning includes inputting data and a desired output into a machine learning model, in addition to furnishing feedback about the accuracy of predictions during training. A trained machine learning model may be applied to a set of data to calculate an output value.

For example, a supervised machine learning model can be used to predict an upcoming maintenance intervention based on data relating to device usage and past maintenance. As described herein, a centralized database, such as a cloud computing environment, can store data related to events retrieved from at least one device. For example, the at least one device can be a printer.

Selecting a machine learning model can include logging events data 102. For example, as described herein, events data relating to monitored sensory inputs and maintenance interventions of at least one device can be exported to the centralized database, where it can be stored. The events data can include data relating to usage and maintenance interventions of the at least one device. A device can include a system to generate an events log to log events data based on events that occur relating to the device. For example, the device can include a system to generate an events log that tracks a series of events that occurred in the time prior to a maintenance intervention. The data used to generate the events log can be exported to the centralized database.

As illustrated in FIG. 1, selecting a machine learning model can include data cleaning 104. Data cleaning 104 can include processing the data stored within the centralized database to provide a machine learning model used for maintenance intervention predicting with a training data set. Data cleaning 104 can include retrieving data, such as a serial number of the device, an event code, a severity of the event, a finish date of a maintenance intervention, a start date of a maintenance intervention, a date of an event that occurred between a first maintenance intervention and a second intervention, a sequential number to identify events related to each intervention, an amount of printed pages, an amount of scanned pages, and/or other data relating to the usage or the maintenance intervention of the device.

Predicting when a device may experience failure can include using at least one machine learning model. For example, a classification model may be used to predict whether the device is at risk of an upcoming failure, while a regression model can be used to predict a float number. The float number can be a value indicating an amount of time until the device may experience the upcoming failure. Thus, if the classification model predicts an upcoming device failure, the regression model can be used to predict when the next maintenance intervention of the device would be.

The prediction of an upcoming maintenance intervention can be referred to as a health status. The health status can include multiple categories. For example, the health status may be classified as either "good" or "bad". A device that is classified as "bad" can indicate that the device is at risk of experiencing an upcoming failure, while a device that is classified as "good" can indicate that the device is not at risk of experiencing an upcoming failure. As described herein, the health status may be used to detect a wear out failure. A wear out failure can occur when the device has exceeded its estimated lifetime. Usage of the device can damage components of the device, which may result in failure. Moreover, replacement of such components may overload additional components, which can lead to a maintenance intervention.

In some examples, selecting the machine learning model can include using data stored within the centralized database to train the machine learning models. The data used to train the machine learning models may be processed by data cleaning 104. For example, data cleaning 104 can process data stored within the centralized database and create a comma separated values (CSV) file that can be used to train and validate the machine learning model. The CSV file can include information such as an event code, severity of the event, and a timestamp of events related to the usage of the device, among other information.

Feature engineering 106 can be applied to the CSV file to identify and convert the information into a format that can be used to train the machine learning model. For example, feature engineering 106 may identify a run time of the device between a first maintenance intervention and a selected event, a number of printed pages between the first maintenance intervention and the selected event, a number of scanned pages between the first maintenance intervention and the selected event, and/or other features that can be used to predict a maintenance intervention.

Information identified by feature engineering 106 can be used to train machine learning models to predict the health status and the float number of the device. Model selecting 108 can include two stages to select a machine learning model: model training 112 and model testing 114. As described herein, a first machine learning model can predict the health status of the device and a second machine learning model can predict the float number of the device.

Model training 112 can include training the number of machine learning models, and model testing 114 can include evaluating each of the number of machine learning models using a set of metrics. For example, a training sample to train the machine learning model to predict the health status of the device can include a set of values based on data retrieved within a selected interval of time. The selected interval of time can be between the first day of a first detected event after a first maintenance intervention and a second day of a second detected event before a second maintenance intervention.

Each training sample can be labeled as "good" or "bad" to allow the machine learning training process to identify patterns in the time leading up to a maintenance intervention. Data retrieved from the device can be evaluated to determine which machine learning model among the number of machine learning models to use to predict the health status of the device based on similarities between the identified patterns and retrieved data.

A training sample to train the machine learning model to predict the float number of the device can include a set of values based on data retrieved within a selected interval of time. The selected interval of time can be between the first day of a first detected event after a first maintenance intervention and a second day of a second detected event before a second maintenance intervention. Each training sample can be labeled with a float number that is a time interval between the second detected event and the last detected event before the second maintenance intervention to allow the machine learning training process to identify patterns in the time leading up to the maintenance intervention. Data retrieved from the device may be evaluated to determine which machine learning model to use to predict the float number of the device based on similarities between the identified patterns and the retrieved data.

Selecting the machine learning model can include a validating 116 the machine learning model selected at model selecting 108. For example, the selected machine learning model, which has been trained and tested can be validated using data retrieved from the device. Validating 116 can include determining whether the information processed at feature engineering 106 provides what is classified as a "good result". A "good result" can include either the same metrics of the machine learning model testing or a simulation of the model on production. Validating 116 can include measuring the quality of the prediction using data that was not part of model selecting 108. For example, if validating 116 results in a determination that the results of the machine learning model selected at model selecting 108 are good, then the selected machine learning model can be used to predict the maintenance intervention. If validating 116 results in a determination that the results of the machine learning model selected at model selecting 108 are not good, then feature engineering 106 can include processing the information to create a new features set to train the machine learning models, and a new machine learning model can be selected.

Figure 2:
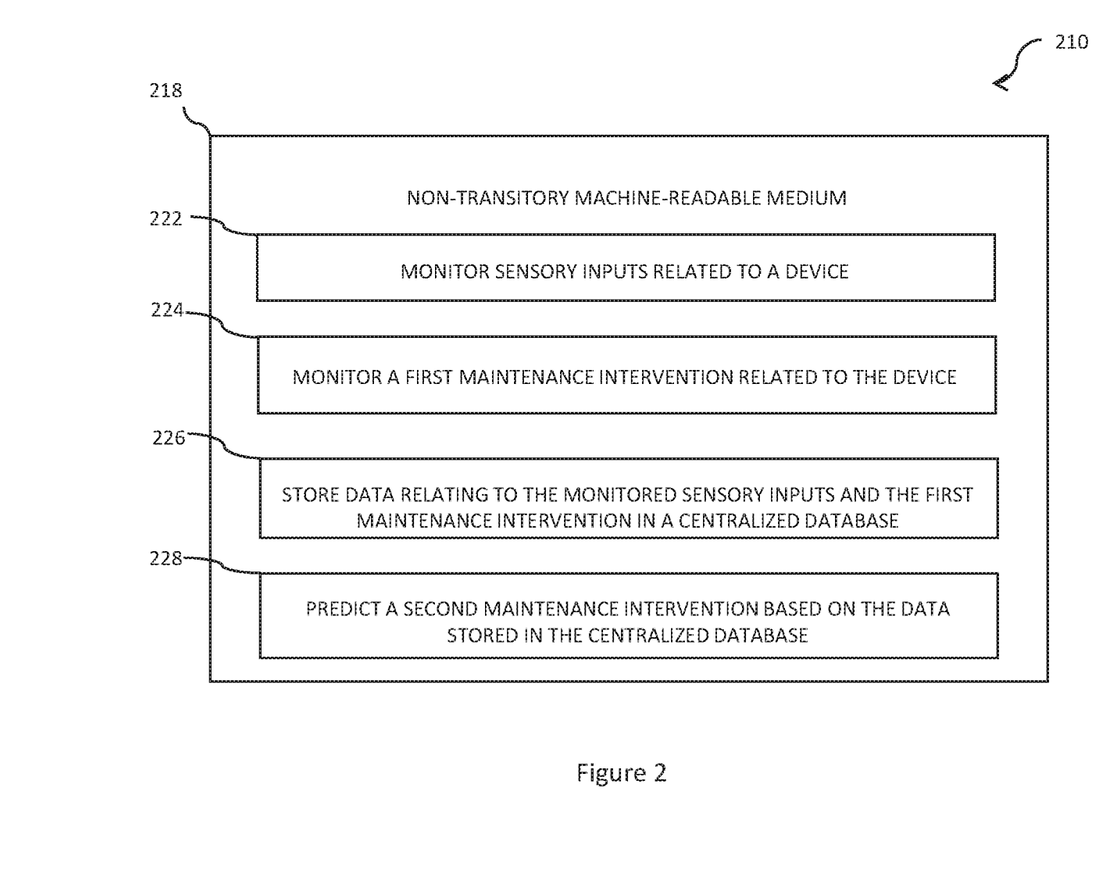
FIG. 2 illustrates an example of a system for maintenance intervention predicting consistent with the disclosure.

FIG. 2 illustrates an example system 210 for maintenance intervention predicting consistent with the disclosure. System 210 can include a non-transitory machine-readable storage medium 218. Non-transitory machine-readable storage medium 218 can be an electronic, magnetic, optical, or other physical storage device that stores executable instructions. Thus, non-transitory machine-readable storage medium 218 can be, for example, Random Access Memory (RAM), an Electrically-Erasable Programmable Read-Only Memory (EEPROM), a storage drive, an optical disc, and the like. In this example, the executable instructions may be "installed" on the system 210. Additionally and/or alternatively, non-transitory machine-readable storage medium 218 can be a portable, external or remote storage medium, for example, that allows system 210 to download the instructions from the portable/external/remote storage medium. In this situation, the executable instructions can be part of an "installation package".

Instructions 222 can include instructions executable to monitor sensory inputs related to a device. The device can include a printer or any other output device. The device can include at least one sensor configured to collect sensory inputs, such as, but not limited to, sensory signals, ultrasound signals, light, movement, tracking indicators, temperature, energy consumption indicators, and the like based on operation of the device. The sensors can include, but are not limited to, sound capturing sensors, motion tracking sensors, energy consumption meters, temperature meters, and the like. The sensors can be communicatively coupled or otherwise connected to the device.

Monitoring sensory inputs related to the device can include monitoring data related to the usage of the device. Monitoring the sensory inputs can include selecting a time interval to monitor the sensory inputs. For example, sensory inputs can be monitored between a first event that occurred after a first maintenance intervention and a second event that occurred after the first maintenance intervention.

The device can include an information log. The information log can include data related to the usage of the device and can generate an events log according to the sensory data. The events log can be stored in a system log within the device. Additionally, as described herein, the events log can export the data relating to the sensory inputs to a centralized database. The data relating to the sensory inputs can be used to predict a maintenance intervention as a result of the device or a component of the device approaching a failure.

Instructions 224 can include instructions executable to monitor a first maintenance intervention related to the device. As described herein, a maintenance intervention can include maintenance performed on a device that has experienced a failure or is identified as being at risk of an upcoming failure. The failure can include a wear out failure, which may occur when the device or a component of the device has exceeded its estimated lifetime.

Monitoring the first maintenance intervention related to the device can include recording each time the device experiences a failure resulting in a maintenance intervention. As described herein, the data recorded relating to the maintenance intervention may be stored in the centralized database. Storing a record of maintenance interventions of the device can allow for the retrieval of the events that occurred prior to the maintenance intervention. These events may be used to predict maintenance interventions of the same device or a similar device.

Instructions 226 can include instructions executable to store data relating to the monitored sensory inputs and the first maintenance intervention in a centralized database. The centralized database can include a cloud computing environment. The centralized database can receive and store data relating to the monitored sensory inputs and the maintenance interventions of device.

Additionally, as described herein, the centralized database can store data relating to the monitored sensory inputs and maintenance interventions of more than one device. For example, the database can store data of a fleet of devices. The stored data can be used to select a machine learning model to predict a maintenance intervention of the device. The centralized database may include more than one machine learning model that can be used to predict an upcoming maintenance intervention of the device.

Instructions 228 can include instructions executable to predict a second maintenance intervention based on the data stored in the centralized database. For example, predicting a second maintenance intervention of the device can include analyzing the data stored in the central database. The analysis can include, but is not limited to, inputting data related to the sensory inputs and the recorded maintenance interventions into supervised machine learning model to predict an upcoming maintenance intervention.

Additionally, the analysis can also include selecting a supervised machine learning model to analyze the data stored in the centralized database. The centralized database can include a machine learning model library, where the machine learning model library includes at least one machine learning model. As illustrated by FIG. 1, the data stored within the centralized database can be used to select a machine learning model among the number of machine learning models. For example, the data stored within the centralized database can be processed and used to train and test the number of stored machine learning models. A selected machine learning model can be validated and selected to predict the upcoming maintenance intervention.

Predicting the upcoming maintenance intervention may include providing a notification of an upcoming maintenance intervention. The notification can include displaying the device's health status and/or float number. For example, the format of the health status can include good-bad, 1-0, true-false, or other format that may describe the health status of the device. The format of the time left to the predicted maintenance intervention can include a float number that represents an interval of time using a unit such as months, weeks, days, hours, minutes, second, among others.

If the machine learning model predicts that the device is not at risk of experiencing failure, the notification can be an indication that the device is not at risk of experiencing a failure that would result in a maintenance intervention. In another example, if the machine learning model predicts that the device is at risk of experiencing failure, the notification can be an indication that the device may be at risk of experiencing failure resulting in a maintenance intervention. The indication may also include the amount of time until the maintenance intervention.

Figure 3:
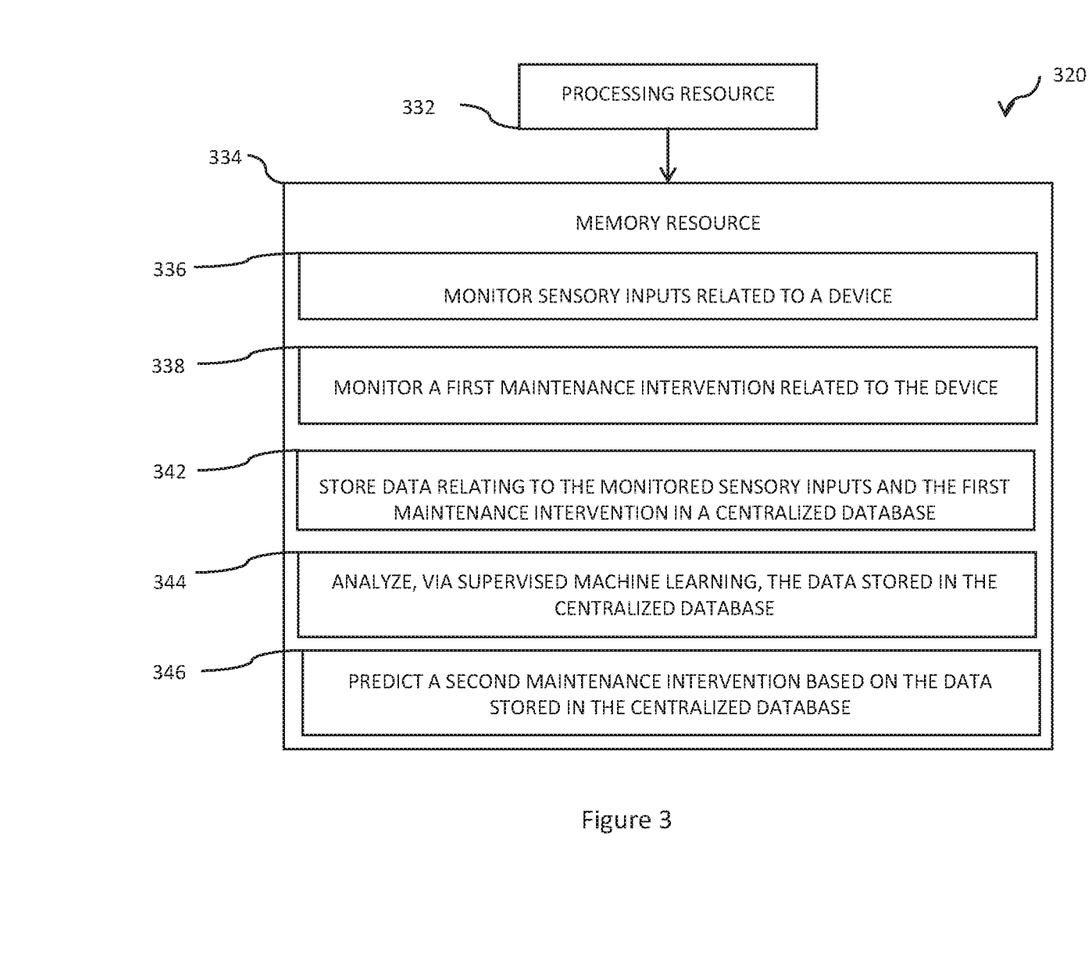
FIG. 3 illustrates an example of another system for maintenance intervention predicting consistent with the disclosure.

FIG. 3 illustrates an example of a system 320 for maintenance intervention predicting consistent with the disclosure. As illustrated in FIG. 3, the system 320 can include a processing resource 332 coupled to the memory resource 334, on which instructions may be stored, such as instructions 336, 338, 342, 344, and 346. Although the following descriptions refer to an individual processing resource and an individual memory resource, the descriptions may also apply to a system with multiple processing resources and multiple memory resources. In such examples, the instructions may be distributed (e.g., stored) across multiple processing resources.

Processing resource 332 can be a central processing unit (CPU), a semiconductor based microprocessor, and/or other hardware devices suitable for retrieval and execution of instructions stored in memory resource 334. Processing resource 332 can fetch, decode, and execute instructions 336, 338, 342, 344, and 346, or a combination thereof. As an alternative or in addition to retrieving and executing instructions, processing resource 336 may include an electronic circuit that includes electronic components for performing the functionality of instructions 336, 338, 342, 344, and 346, or combination thereof.

Memory resource 334 can be volatile or nonvolatile memory. Memory resource 334 can be removable (e.g., portable) memory, or non-removable (e.g., internal) memory. For example, memory resource 334 can be random access memory (RAM) (e.g., dynamic random access memory (DRAM) and/or phase change random access memory (PCRAM)), read-only memory (ROM) (e.g., EEPROM and/or compact-disk read-only memory (CR-ROM), flash memory, a laser disc, a digital versatile disk (DVD) or other optical disk storage, and/or a magnetic medium such as magnetic cassettes, tapes, or disks, among other types of memory.

Instructions 336, when executed by processing resource 332, can cause memory resource 334 to monitor sensory inputs related to a device. The device can be a printer. As described herein, monitoring sensory inputs relating to the device can include generating system log information. For example, the system log information can include data relating to the usage of the device. The system log information can be exported from the device to a centralized database.

Instructions 338, when executed by processing resource 332, can cause memory resource 334 to monitor a first maintenance intervention related to the device. A maintenance intervention can be related to a device failure, where the device failure can be based on the device exceeding an estimated lifetime. As described herein, monitoring the first maintenance intervention related to the device can include tracking each maintenance intervention of the device. The system log information can include information relating to the events and device usage leading up to the maintenance intervention.

Instructions 342, when executed by processing resource 332, can cause memory resource 334 to store data relating to the monitored sensory inputs and the first maintenance intervention in a centralized database. As described herein, the centralized database can store data received from a number of devices. For example, the centralized database can store data received from a single device or a fleet of devices. The data stored in the centralized database may be used to select at least one machine learning model to predict an upcoming maintenance intervention of the device.

Instructions 344, when executed by processing resource 332, can cause memory resource 334 to analyze, via supervised machine learning, the data stored in the centralized database. The centralized database can include a machine learning model library that can include at least one machine learning model. The system 320 can include instructions that are executable to select a supervised machine learning model to analyze the data stored in the centralized database.

As described herein, analyzing the data stored in the centralized database related to the device can provide a health status of the device. For example, the health status of the device can indicate whether the device is at risk of experiencing a failure.

Instructions 346, when executed by processing resource 332, can cause memory resource 334 to predict a second maintenance intervention based on the analyzed data stored in the centralized database. As described herein, predicting a second maintenance intervention can be based on the analyzed data stored in the centralized database. If the health status indicates that the device is at risk of failure, then a maintenance intervention can be predicted, as well as the amount of time until the predicted maintenance intervention. As described herein, a maintenance intervention can be related to a device failure due to the device exceeding the estimated lifetime of the device.

Predicting the second maintenance intervention can include providing a notification of the second maintenance intervention. Providing a notification of the second maintenance intervention can include providing a warning of an upcoming maintenance intervention, an amount of time until the upcoming maintenance intervention, or both.

Figure 4:
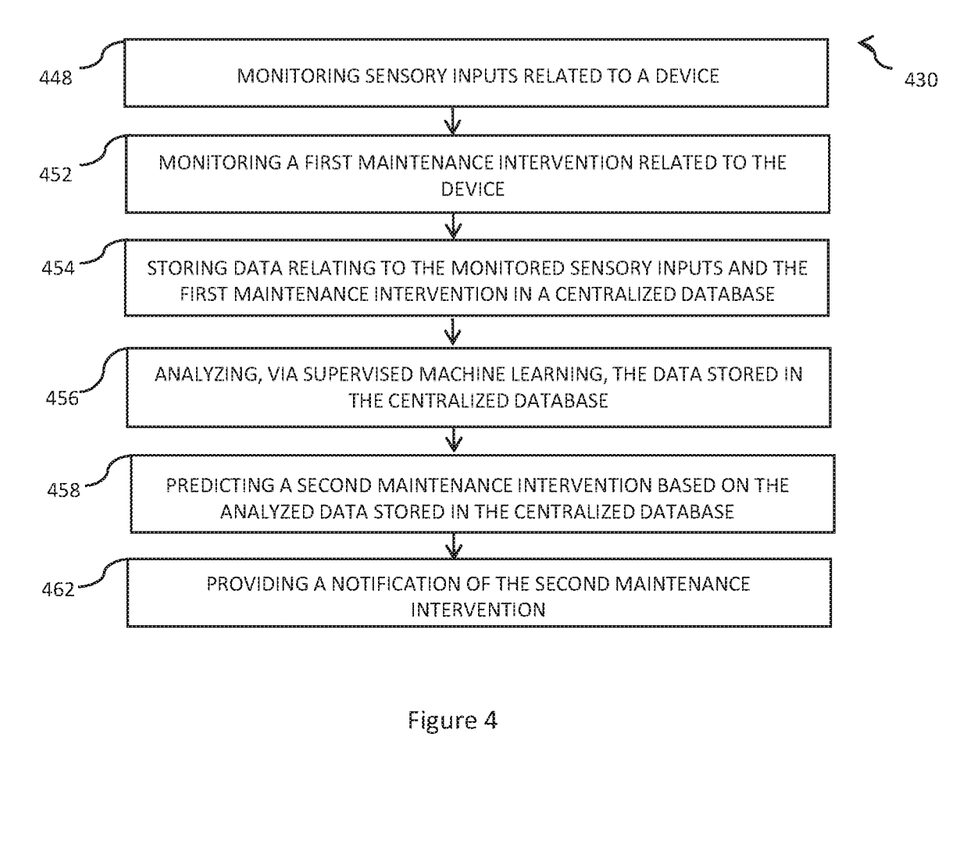
FIG. 4 illustrates an example of a method for maintenance intervention predicting consistent with the disclosure.

FIG. 4 illustrates an example of method 430 for maintenance intervention predicting consistent with the disclosure. At 448, the method 430 can include monitoring sensory inputs related to a device. For example, the device can be a printer, and monitoring sensory inputs relating to the device can include generating system log information. For example, the system log information can include data relating to the usage of the device. The system log information can be exported from the device to a centralized database.

At 452, the method 430 can include monitoring a first maintenance intervention related to the device. Monitoring the first maintenance intervention related to the device can include tracking each maintenance intervention of the device. The system log information can include information relating to the events and device usage leading up to the maintenance intervention.

At 454, the method 430 can include storing data relating to the monitored sensory inputs and the first maintenance intervention in a centralized database. The centralized database can store data received from a number of devices. For example, the centralized database can store data received from a single device or a fleet of devices. The data stored in the centralized database may be used to select at least one machine learning model to predict a maintenance intervention of the device.

At 456, the method 430 can include analyzing, via supervised machine learning, the data stored in the centralized database. Analyzing the data stored in the centralized database related to the device can provide a health status of the device. For example, the health status of the device can indicate whether the device is at risk of experiencing a failure that may result in a maintenance intervention.

The method 430, at 458, can include predicting a second maintenance intervention based on the analyzed data stored in the centralized database. If the health status indicates that the device is at risk of failure, then a maintenance intervention can be predicted, as well as the amount of time until the predicted maintenance intervention.

At 462, the method 430 can include providing a notification of the second maintenance intervention. Providing a notification of the second maintenance intervention can include providing a warning of an upcoming maintenance intervention, an amount of time until the upcoming maintenance intervention, or both.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A non-transitory machine-readable storage medium having stored thereon machine-readable instructions executable to cause a processing resource to:

monitor sensory inputs related to a device;

monitor a first maintenance intervention related to the device;

store data relating to the monitored sensory inputs and the first maintenance intervention in a centralized database;

validate a result of a selected supervised machine learning model used to analyze the data stored in the centralized database;

predict a second maintenance intervention based on the data stored in the centralized database and the selected supervised machine learning model; and perform the second maintenance intervention based on the prediction.

2. The medium of claim 1, wherein the instructions are executable to select a time interval to monitor the sensory inputs.

3. The medium of claim 1, wherein the instructions are executable to store the data relating to the monitored sensory inputs in a system log.

4. The medium of claim 1, wherein the device is a printer.

5. The medium of claim 1, wherein the instructions are executable to provide a notification of the second maintenance intervention.

6. The medium of claim 1, wherein the instructions are executable to analyze the data stored in the centralized database via supervised machine learning.

7. A system, comprising:

a processing resource; and a memory resource storing machine-readable instructions executable to cause the processing resource to:

monitor sensory inputs related to a device;

monitor a first maintenance intervention related to the device;
store data relating to the monitored sensory inputs and the first maintenance intervention in a centralized database;
analyze, via supervised machine learning, the data stored in the centralized database;
validate a result of a selected supervised machine learning model used to analyze the data stored in the centralized database;
predict a second maintenance intervention based on the analyzed data stored in the centralized database and the selected supervised machine learning model; and
perform the second maintenance intervention based on the prediction.

8. The system of claim 7, wherein the instructions are executable to select a supervised machine learning model to analyze the data stored in the centralized database.

9. The system of claim 7, wherein the first and the second maintenance intervention are related to a device failure, wherein the device failure is based on the device exceeding an estimated lifetime.

10. The system of claim 7, wherein the centralized database includes a machine learning model library, and wherein the machine learning model library includes at least one machine learning model.

11. A computer implemented method, comprising:
monitoring sensory inputs related to a device;
monitoring a first maintenance intervention related to the device;
storing data relating to the monitored sensory inputs and the first maintenance intervention in a centralized database;
analyzing, via supervised machine learning, the data stored in the centralized database;
validating a result of a selected supervised machine learning model used to analyze the data stored in the centralized database;
predicting a second maintenance intervention based on the analyzed data stored in the centralized database and the selected supervised machine learning model;
providing a notification of the second maintenance intervention; and
performing the second maintenance intervention based on the prediction.

12. The method of claim 11, wherein monitoring sensory inputs related to the machine includes generating system log information.

13. The method of claim 11, wherein providing a notification of the second maintenance intervention includes providing an amount of time until the second maintenance intervention.

14. The method of claim 11, further comprising providing a health status of the device.

* * * * *